(12) United States Patent
Morgan

(10) Patent No.: US 7,459,882 B2
(45) Date of Patent: Dec. 2, 2008

(54) RECHARGEABLE BATTERIES

(76) Inventor: Richard Morgan, 10 Elwood Rise, Chalfont St. Giles, Buckinghamshire HP8 4SU (GB)

( * ) Notice: Subject to any disclaimer, the term of this patent is extended or adjusted under 35 U.S.C. 154(b) by 308 days.

(21) Appl. No.: 10/878,667

(22) Filed: Jun. 28, 2004

(65) Prior Publication Data
US 2005/0029986 A1 Feb. 10, 2005

Related U.S. Application Data

(63) Continuation-in-part of application No. 10/221,231, filed as application No. PCT/GB01/00955 on Mar. 6, 2001, now abandoned.

(30) Foreign Application Priority Data

Mar. 6, 2000 (GB) ................................. 0005359.5
Jun. 27, 2003 (GB) ................................. 9215006.7

(51) Int. Cl.
*H01M 10/46* (2006.01)
(52) U.S. Cl. ..................................................... 320/112
(58) Field of Classification Search ................. 320/107, 320/112, 116, 120, 122, 150
See application file for complete search history.

(56) References Cited

U.S. PATENT DOCUMENTS

| 5,871,859 | A | * | 2/1999 | Parise | 320/150 |
| 6,031,355 | A | * | 2/2000 | Rich | 320/117 |
| 6,260,360 | B1 | * | 7/2001 | Wheeler | 62/3.6 |
| 6,268,710 | B1 | * | 7/2001 | Koga | 320/116 |
| 6,346,794 | B1 | * | 2/2002 | Odaohhara | 320/116 |
| 6,351,097 | B1 | * | 2/2002 | Oh | 320/107 |
| 6,353,304 | B1 | * | 3/2002 | Atcitty et al. | 320/116 |
| 2001/0034163 | A1 | * | 10/2001 | Chiang | 439/660 |
| 2005/0040944 | A1 | * | 2/2005 | Contestabile | 340/539.13 |
| 2005/0232747 | A1 | * | 10/2005 | Brackmann et al. | 414/803 |

* cited by examiner

*Primary Examiner*—Edward Tso
(74) *Attorney, Agent, or Firm*—Bradley N. Ruben

(57) ABSTRACT

An improved rechargeable battery which comprises: a plurality of battery cells connected together to discharge in parallel, each of the cells, or each group or groups of the cells having its own respective recharging input; and an electrical switching circuit to switch a number of the battery cells or groups of cells to connect to their respective recharging input for recharging each cell or group of cells individually.

29 Claims, 2 Drawing Sheets

RECHARGEABLE BATTERIES

RELATED APPLICATIONS

This application is a continuation-in-part of application Ser. No. 10/221,231, filed Sep. 5, 2002, now abandoned which is the U.S. national phase of PCT/GB01/00955, filed Mar. 6, 2001, based on GB-0005359.5, filed Mar. 6, 2000, and of GB-9315006.7, filed 27 Jun. 2003, the disclosures of which are all incorporated herein by reference.

FIELD OF THE INVENTION

The present invention concerns rechargeable batteries.

BACKGROUND TO THE INVENTION

Major advances have been made in recent years in computing and telecommunications electronic hardware, and in part because of the heavy investment in research and development in these high technology areas, advancements are now being pursued in the field of battery design.

The compelling objectives of increasing battery capacity while reducing their volume and weight and meeting ecological concerns are now being achieved inter alia through the introduction of nickel metal hydride (Ni-MH) batteries. Such batteries offer higher energy densities than Ni-Cad batteries enabling downscaling of the batteries while enhancing the run time of the batteries. A Ni-MH battery has approximately double the capacity of an equivalent sized Ni-Cad battery.

Although Ni-MH batteries have greater capacity per unit size and weight and are more ecologically acceptable, care must still be taken with these batteries since they are prone to risk of oxygen or hydrogen build up. Oxygen is normally generated at the positive electrode toward the end of charging of the Ni-MH cell and must be consumed to avoid pressure build up. Hydrogen is generated throughout the charging of the battery and is normally stored as the hydride of the metal alloy anode. Mistreatment of the battery may, however, lead to build up of hydrogen. Build up of either of these gases can represent a significant hazard.

A relatively slower rate of charging than Ni-Cad batteries and lesser high drain capability represent further limitations of NiMH batteries and neither NiCad nor NiMH batteries exist with high current yield (e.g. 64 Amps) or which can be rapidly charged to such a level (e.g. in as little as four hours). This severely limits the usefulness of these batteries. Furthermore these batteries are rendered useless at markedly subzero ambient temperatures.

It is a general objective of the present invention to overcome or significantly mitigate one or more of the aforementioned serious problems.

There is, furthermore, a need for a rechargeable battery that is highly compact yet adapted for use in hostile environments and suited to being left 'outdoors' unattended for many hours, having the ability to store a high level of charge for delivery over prolonged periods. Applications for the battery are many and diverse and include, for example, powering perimeter security installations as well as providing power to remote sensing and surveillance equipment. In some cases the installations involved may be many miles, even hundreds or more miles remote from the nearest technicians and the problem of maintaining an up to date knowledge of the status and performance of the batteries can be acute.

In this general technical field there is little and inadequate current provision to enable remote battery monitoring and the present invention seeks to overcome these shortcomings.

SUMMARY OF THE INVENTION

According to a first aspect of the present invention there is provided a rechargeable battery which comprises: a plurality of battery cells at least some of which are connected together to discharge in parallel, each of the parallel discharging cells, or each group of parallel discharging groups of the cells having its own respective recharging input; and an electrical switching means to switch a number of the battery cells or groups of cells from being connected to discharge in parallel to instead connect to their respective recharging input for recharging each of said cells or group of cells With this configuration the cells are able to yield a considerably higher current and be recharged far more rapidly than conventional Ni-MH and Ni-Cad batteries.

The individual cells or groups of cells that are arranged to discharge in parallel to each other can be substantially simultaneously recharged by being recharged independently of each other leading to great savings in recharging time.

The groups of cells that are arranged to discharge in parallel to other groups are suitably battery packs within which a plurality of cells are arranged in series Once recharging has been accomplished the switching means may revert, suitably in response to a signal, to re-connect the cells for discharging in parallel.

The recharging input for each battery cell or group of cells suitably comprises a respective pin of a multi pin plug such as, for example, an Amphenol plug. A corresponding recharging device is suitably provided and which comprises a plurality of recharging means in a housing and having a connector having a plurality of pins or sockets to couple to a said rechargeable battery.

The switch means that transfers the cells or groups of cells from discharge to recharge may be an electrical component or circuit and is suitably an electrical switching means that can be electrically triggered to switch over multiple cells or groups of cells simultaneously.

The preferred electrical switching means comprises one or more relays and particularly preferably comprise multi poled relays. In the preferred embodiment the or each relay is a relay having four or more poles.

Preferably at least one of and suitably both of the recharging inputs and switching means are integrally assembled with the battery suitably being on or within a casing of the battery. These could, however, be part of an interface module that is coupled to the battery in use.

The battery preferably further comprises a processing means and sensors to sense and monitor the charge status of the battery.

Particularly preferably the processing means is adapted to monitor the charge status of each cell or group of cells independently of each other cell or group of cells.

Particularly preferably the sensors, or further sensors, sense the temperature of at least one of the cells or groups of cells individually or of the cells as a whole and the processing means is adapted to alter the rate of recharging or stop recharging if the temperature exceeds predetermined limits.

In a particularly preferred embodiment of the invention in which the battery has a battery casing adapted for thermal insulation, the casing is made from aluminium or other suitable metal or metal alloy and is coated in nylon and particularly preferably a type of nylon that is known as RILSAN (registered trade mark—ATOCHEM Elf Aquitaine).

A double coating of the nylon is suitably applied to both the inner and outer surfaces of the casing. The thermal insulation is highly effective and may be further enhanced by the use of foam-in-place resin such as polyurethane resin that is introduced into the battery within the casing to foam and cure and fill out voids within the casing.

With these measures it is possible to sufficiently insulate the battery to enable it to operate at temperatures as low as −20 to −25° C. However, for the battery to be able to operate in extreme polar weather conditions further enhancements are required.

Operation of the battery at temperatures below −25° C. and to as low as −52° C. or thereabouts can be achieved through redesign of the casing, as follows.

In one aspect of the invention a battery comprising a plurality of the cells is housed within an inner casing that is housed in turn within an outer casing and having an air gap between the inner casing and the outer casing and with heating means being provided to heat the air gap in response to temperature sensing means that senses any reduction of the temperature of the air in the air gap below a predetermined threshold. The heating means is suitably powered by the battery and although it will drain some of the battery's charge it enables operation in previously impossible operating conditions.

In a yet further important aspect of the present invention there is provided a rechargeable battery comprising the plurality of battery cells in a casing, the battery cells being of nickel metal hydride type and the casing having an electrically operated vent in the casing and which opens when the battery is coupled to a recharging device. This vent suitably opens automatically on initiation of recharging and closes automatically upon completion of recharging.

In a yet further aspect the present invention provides a battery that is uniquely equipped with an electronics communications package for remote monitoring. The package includes a transceiver for remote communication. In the preferred embodiment the transceiver is a GSM transceiver for satellite communications and/or radio communications and particularly preferably further comprises a GPS or equivalent facility capable of monitoring the location of the battery.

With a package comprising each of these features the battery can be remotely interrogated and monitored for its status and performance including its charge status, remaining run time, present current drain and, usefully, monitored for its position. Via the GPS or similar facility is possible to monitor whether the unit has been disturbed/moved from its original location and track where it is moved to. Furthermore, although communication with the unity may be on demand, a motion sensor such as a tremor sensor may be built into the unit and serve as a trigger to switch on the transceiver for alerting the operator even when the unit is not first polled by the operator.

The unit can thus phone alert the unit's operator via mobile phone or satellite communication as well as being able to provide detailed status information both current and, furthermore, historically. Alternatively or additionally historical information may be collated at the operator's end.

The sophistication of the system enables multiple batteries not only to be independently polled for information but also mapped and monitored from a centralised computer-based facility with simple geographical map screen displays identifying the location of each unit with a respective on-screen marker pin and information on each being obtainable at the touch of a button. The ability of the unit to communicate on remote demand or in response to local triggering enables power conservation, by drawing power only when required.

BRIEF DESCRIPTION OF THE DRAWINGS

A preferred embodiment of the present invention will now be described, by way of example, with reference to the accompanying drawings wherein.

DESCRIPTION OF THE SPECIFIC EMBODIMENTS

Figure 1:
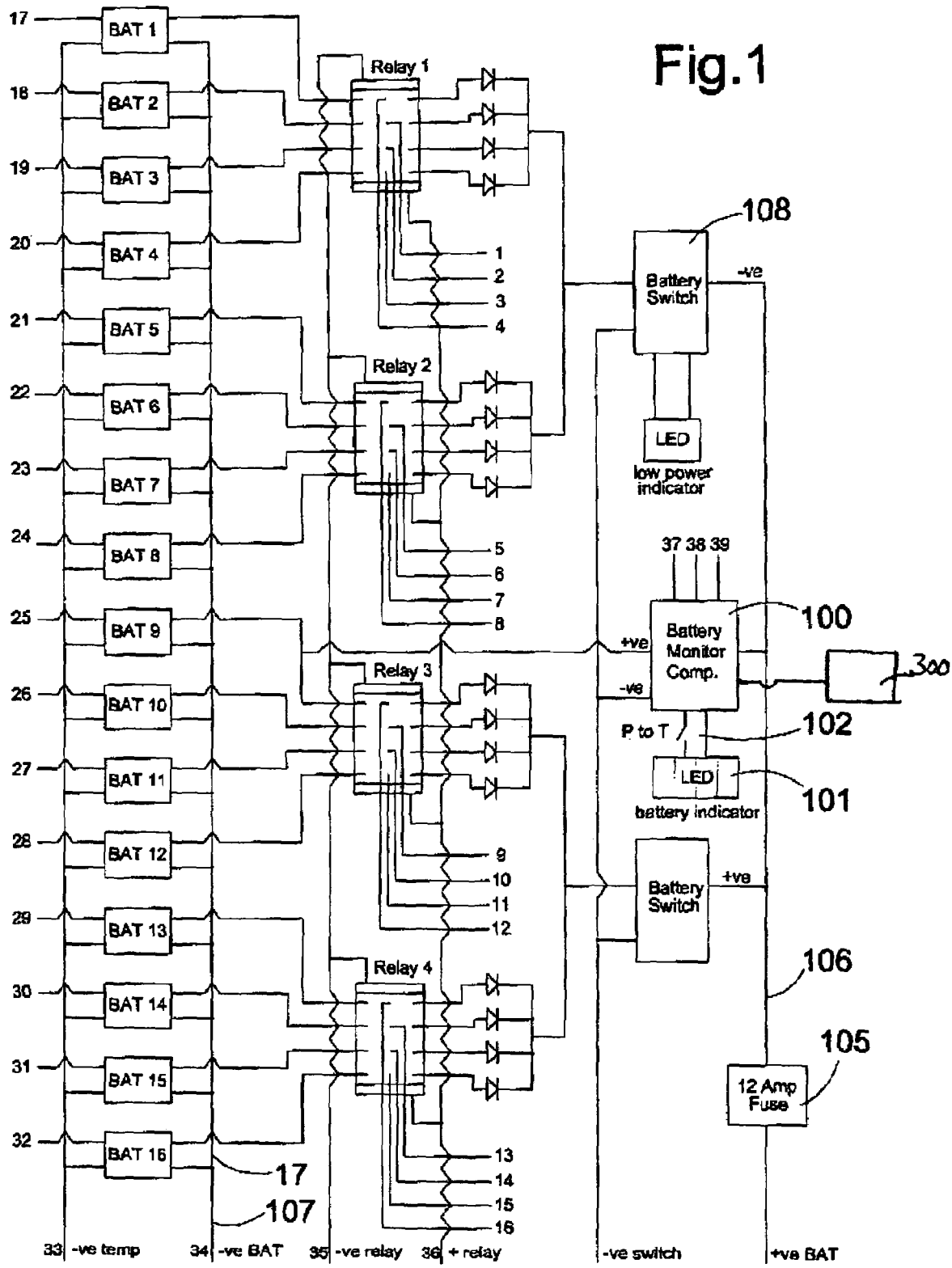
FIG. 1 is a schematic general circuit diagram of the preferred embodiment of rechargeable battery, here shown as comprising 16 battery packs/groups of cells each having 10 cells in series and with an integral electronic module for monitoring the charge status of the battery.
Figure 2:
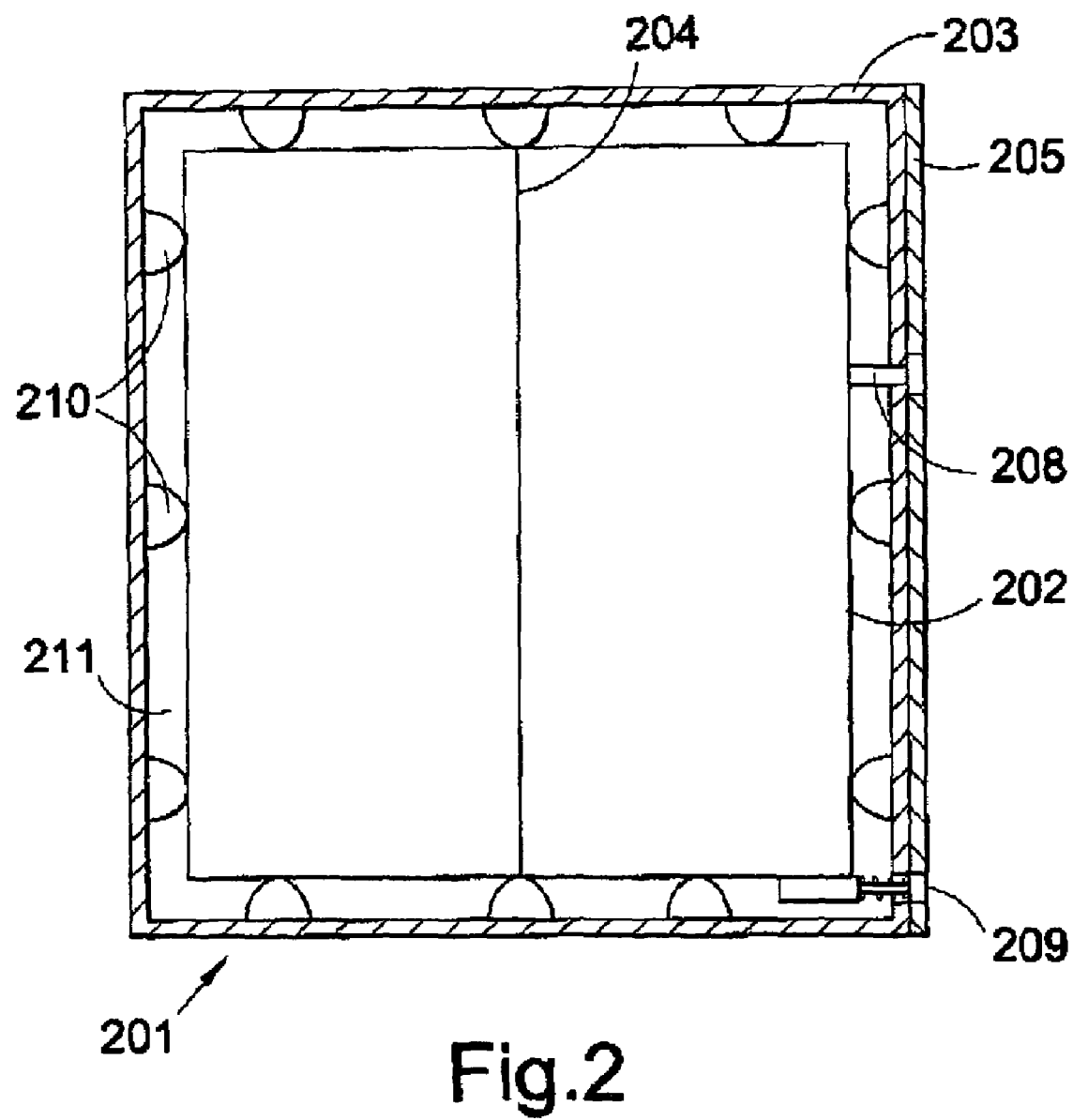
FIG. 2 is a schematic sectional view of the battery housed within a casing having an inner and outer shell incorporating temperature regulation of the air gap between the shells and a safety venting means for use during recharging.

Referring to FIG. 1, sixteen Ni-MH battery packs BAT 1-BAT 16 each pack having ten cells in series and storing 4 Ah of charge are positioned inside the battery casing 201 (FIG. 2).

Each battery pack BAT 1-BAT 16 contains its own protection devices and allows an in-built redundancy capability down to the last remaining pack.

The casing 201 for the rechargeable battery comprises an inner shell 202, an outer shell 203 made from 2 mm rigidized aluminium, in the shape of a box with a removable lid. All corners and joints at least of the outer shell 203 are welded to improve structural strength and to prevent water from entering the rechargeable battery unit.

Both the inner and outer shells 202, 203 are covered with a double coating of 'Rilsan Nylon' giving an extremely hard wearing surface as well as reducing internal condensation to a minimum.

The inner shell 202 is suitably divided into two compartments via a bulk-head, 204 one for the battery packs and the other for the "electronics".

A removable plate module 205 situated on the front of the casing 201 contains/presents to the user the necessary plugs and sockets for connecting to a load or to a recharging device, as well as a press to test switch 102, an LED display unit 101 and a safety venting valve 209. This module plate 205 is suitably attached to the casing 201 via eight Allen key bolts together with a rubber gasket and silicone compound to prevent water leakage.

The lid of the casing 201 is suitably also is fitted via eight Allen key bolts together with a rubber gasket and silicone rubber compound.

To facilitate handling, two 'D' handles are suitably situated at the front of the battery. The handles will prevent damage to the sockets as well as providing a carrying capability.

Electronics

The positive terminal of each battery pack BAT 1-BAT 16 is connected to one of four 10 g shock Mil spec four pole relays, Relay 1-4. The park mode terminal within the relay for each battery pack BAT 1-BAT 16 is fitted with a diode providing feedback current protection. The preferred diode is a Schottky diode, suitably IN5820RL.

All sixteen outputs from the diodes are-connected together via two battery switches SW1, SW2 (or suitably more—e.g. four in one preferred embodiment) designed to avoid the over discharge of the battery packs BAT 1-BAT 16. A 12 Amp thermal fuse 105 is fitted to the positive output lead 106, protecting the battery from accidental short circuit of the output leads 106, 107.

When the charger (not shown) is plugged into the battery, the relay switches Relay 1-4 are changed to the charging terminals which effectively separates the positive output terminals for each of the sixteen battery packs BAT 1-16.

The relay charging terminals are connected to a forty one pin Amphenol plug 208 situated on the battery front plate module 105.

One of the 10K NTC thermistor legs from each battery pack BAT 1-BAT 16 is also connected to a pin of the forty one pin Amphenol plug 208. The other leg being joined together with the other packs BAT 1-BAT 16 in turn connected to the forty one pin plug 208 as a common negative.

All sixteen battery pack BAT 1-BAT 16 negative terminals are joined together as a common negative line 17 which in turn is split into two legs, one of which runs to the negative output 107 and the other of which runs to the forty one pin plug 208.

A separate 12 volt feed is also connected to the forty one pin plug 208 enabling the relays Relay 1-Relay 4 to be switched when the charger is connected.

An on-board battery analyser 100 together with a gas gauge (not shown) is fitted to the unit allowing an accurate indication of battery state as well as cycle count to be obtained.

A four segment LED display 101 informs the user via a push button 102 (press to test) the exact state of battery capacity including low battery indication.

Smart Battery Module

This comprises the on-board battery analyser 100 and gauge together with the display 101.

Short benefits

Instant display of battery capacity via LEDs including low battery indication.

Battery state, including cycle count, via the SMBus.

Possibility to integrate monitor with host end equipment processor

Features

Compliant with SMBus specification revision 1.0.

Based on the BQ2040.

Accurate battery capacity measurement using coulomb counter.

LED display on demand.

Low power consumption

Low battery indication on demand via LEDs.

Full host communication on SMBus.

The gas gauge uses a sophisticated Voltage to Frequency Converter (VFC) to measure the voltage due to discharge/charge current through a milliohm sense resistor. The wide dynamic range and noise resistance inherent in the integration methodology of the VFC is idea for battery applications. It is also non-quantized and resolution is theoretically infinite (time dependant).

The data acquired by the VFC is conditioned according to 'rules' laid out in the configuration EEprom by an on board RISC processor. This conditioning is dynamic and takes into account the rate and temperature compensation for the battery chemistry used. (Defined in the configuration data held in the EEprom).

Data is provided to a host on demand via a two wire (relative to common) serial interface bus according to the SMBus revision 1.0 specification. The module will also broadcast critical data on the bus.

LED indication is provided on demand by a switch contact. There are four LEDs rated each at 25% capacity. LED number 4 (last 25%) also flashes on low battery capacity when the switch demand is applied.

The module can measure in absolute mode (remaining capacity against design capacity) or relative mode (remaining capacity against full charge capacity—FCC).

Cycle count is also stored where cycle count is defined as a minimum charge/discharge movement.

Self-discharge compensation according to the chemistry is available and dynamically adjusts with temperature.

Initially the module must learn the battery capacity by going from a valid discharge to a full charge (to FCC which is initially set lower than the design capacity to ensure that the ensuing 'count down' from the FCC to the end voltage is valid and then this sets the FCC). As the battery ages the capacity is tracked. Actual capacity versus design capacity at the end of a valid charge is a figure of merit for the battery condition.

Power consumption

Typical 230 micro Amps

Maximum 300 micro Amps

Display

Each LED (1-4) represents 25% of the capacity mode selected (absolute or relative). Default is relative mode. The display will run for about 4 seconds on application of the switch.

Threshold switching accuracy is of the order of 5% between LED segments.

LED 4 will flash on low battery at about 10%.

Low Voltage Protection Switch

Low impedance

Lower power consumption

Configurable in profile and performance

LED warning indicator when switch is about to operate.

High speed electronic switching.

The switch 108 is a battery switch designed to avoid the over discharging of the internal battery packs within the rechargeable battery.

Over discharging cells can reduce life cycle expectancy. It can also result in cell reversal where individual cell(s) within the pack reverse polarity due to the action of 'better' cells within the pack during the discharge process towards the end of remaining pack capacity. Cell reversal will permanently damage the pack which will become unserviceable.

Power consumption is around 250 micro amps and is a compromise between cost and consumption relevant to a practical realisation in such a multiple cell configuration.

The control circuit is a FET switch driven by control logic fronted by a sensitive quad comparator which has an internal reference.

On power up the control circuit will lock in around 7V and if the supply is greater than 12.5V the control FET will be switched on due to the resolution of the battery voltage measured by the potential divider versus the rising comparator.

If the voltage is less than 12.3V on the application of power to the circuit the FET will remain off until a charging supply causes the voltage to exceed this limit. NOTE: this status DOES NOT mean there is any particular capacity in the battery.

In use, as the battery reaches the knee of its discharge curve the falling voltage comparator will cut in and switch on the LED warning. This voltage is set at 10.5 volts. The load, if applied, will be disconnected by the control FET being switched to high impedance. In this state the current consumption is less than 2.5 mA.

As the battery potential falls further than 9.5V the LED drive is cut off and the current consumption of the circuit falls to less than 250 micro amps. The circuit will remain in this state until the battery is recharged beyond 12.3V when the discharge control FET will be switched on allowing a load to be connected to the battery.

If during the low battery standby condition the voltage falls below about 7V then the circuit operation will become indeterminate. Note, on rising voltage from a very low battery (<9V) the LED will illuminate as the voltage rises past 9.5 v but will extinguish at 12.3V, coinciding with the FET switching on and so allowing normal discharge.

As the switch is disconnected for charging and reconnected for operation use then providing the battery voltage is greater than 12.5V the control FET will be switched on allowing load current to flow.

The design is 'well sedated' to allow for resistance to circuit transients due to load disturbances. This includes filtering of the power supply circuit and comparator inputs. A Schottky diode across the control FET ensures its integrity under negative spikes. It also allows a charge path when the FET is turned off. Across the load side of the circuit a fast clamp is provided to ensure that the voltage breakdown of the circuit cannot be exceeded.

To summarise, two potentials exist on the hysteresis curve, one rising and one falling. When the battery is in operation and it is under load, the battery will continue to operate until it reaches around 9.5V to 10.5V depending on conditions. At that point the switch will switch the battery off. If the battery is left in a discharged state and then brought into operation (without charging), it will not function until the battery has been charged to above 12.3V.

Electronic Battery Charger

This is suitably designed to provide all the intelligence to safely, consistently and efficiently fast charge the rechargeable battery.

At 'switch on' from the mains a row of LEDs on the charger will give two flashes to confirm that the charging circuits are operating correctly and that there is no malfunction with the charger. The unit is fitted with a switchable buzzer to inform the operator when the battery is fully charged.

Two seconds after the flashes have finished, the charger is ready for use. Once a start button has been pressed the charging process begins. Both a second and third row of LEDs of the charger will be on, with the top row flashing. This indicates that all the charging circuits are operating correctly. When the charge cycle is complete the second and third row of LEDs will be off and the top row will all be constant. If the buzzer is switched in, it will sound when the last flashing LED is constant informing the operator that the battery is fully charged.

The charger suitably has an automatic heat sensing shut down system as well as delta peak sensing to provide an added safeguard. Ni-MH batteries have a lower negative delta V than Ni-Cads so Peak Voltage Detect (PVD) is used. Validation checks if the temperature range of the battery is outside limits or its end voltage (Edv) is too low then the charger enters its pending stage until such time as these validation parameters come within limits. After the validation phase, a sense resistor connected between battery negative and the charger zero volt (Vss) provides the necessary signal to the servo control loop which regulates the charging current.

The charger unit consists of sixteen individual chargers, each delivering 0.3 C (900 mA) to each internal pack. Should one or more of the charging cards fail the unit will still be able to charge, which gives the charger a large redundancy capability.

Advanced Battery with In-built Communications Facility

A yet further advancement of the battery will now be described. This further improvement suitably has the same highly compact and efficient NiMH battery construction as described above with regard to FIG. 1, but further has installed within the battery casing 201 a sophisticated electronics telecommunications device 300 capable of transmitting and receiving a range of useful technical data. We refer to this further breakthrough in battery design as the "T.R.A.C.E.R. (Tactical Remote Acquisition Communications Energy Resource)". The T.R.A.C.E.R. unit is suitably equipped with Tn-Band GSM, GPS, Sat Comms and Radio Comms capability and comprises a unit that can be deployed and activated in seconds by the press of one button.

The communications device 300 is suitably integated with or separate from but operatively linked with the on-board battery analyser/processor 100, suitably being housed in the smart battery module of the casing and suitably security protected within the battery casing against unauthorised tampering, Once activated the following information can be obtained from as far away as the GSM footprint will allow. (Most countries now come under the GSM footprint.)

Using a Laptop Computer

Operator can dial into battery unit and obtain the following:
1. Co-ordinates in Longitude and Latitude as well as pin position on actual map.
2. Zoom in and out of map.
3. Log co-ordinate data.
4. Call up live actual battery data, including, time to run before flat, temperature, remaining current and actual current being drawn.

Using a Mobile Phone

Operator can text into unit and obtain the following:
1. Obtain time to run in minutes before flat
2. Grid position in Latitude and Longitude
3. Programme timed check-ins
4. Programme alert call back when battery is about to go flat.

To maximize security the T.R.A.C.E.R. has an interchangeable SIM card to allow the operator to change phone numbers at will.

To save power, once activated the GPS will operate until it has acquired a fix and at that point will automatically log the position and then go into sleep mode. At the same time arming a trembler device inside the battery.

If the battery (while in sleep mode) is disturbed or tampered with the GPS will automatically switch on and stay on permanently and at the same time send a text message to the operators mobile phone informing him that the battery has been moved, suitably further advising of the time and date and its new position with updates. As a final safety feature if the situation demands the complete system can be shut down remotely.

Test Procedure

1. Commence

Unit is "Off". Switch on using "On" switch on the unit. NB. Unit must be physically switched on—it cannot be switched on remotely.

2. Switch-On Response

Unit will text a pre-programmed mobile phone with message: "Bat Serial No. X Power Up" plus report 'RTE', 'Last Fix', 'Time & Date'.NB. Receipt of this message confirms battery is 'On' and operating in "Idle/Monitoring Mode. It is seeking to acquire satellites and capable of responding to remote commands.

3. GPS Acquisition Response

On acquiring satellites, unit will text a pre-programmed mobile phone with a message: "Batt. Serial No . . . " Acquired "Lat . . . Long . . . Time/Date . . . RM . . . ". If after 20 minutes, the battery has not acquired satellites, it will send the text message:—"Battery Serial No . . . " No Fix ". . . Last fix Lat/Long, Time/Date, RM" In either event, it will additionally send a message to a PC: "GPS Off" confirming. GPS has been switched off to conserve energy. (NB. If GPS has not been acquired, the; function may be turned back on by dialling the battery sending a command from the PC. See below)

4. "Idle" Monitoring Mode

In this mode, the "gas gauge" is continuously monitoring the battery, GSM remains on, and a "trembler device" is activated to guard against movement (attack). The unit will send messages in either of the following circumstances:

4.1 R.T.E. Alert Level Breached—Unit sends text to pre-programmed mobile phone with a message:

"Batt serial no. . . . " Alert " . . . Last fix Lat/Long, Time/Dat RTE . . . mins"

4.2 Battery Moved/Attacked—Unit sends text to pre-programmed mobile phone with a message:

"Batt Serial Number. . . . " "Moved" Last fix Lat/Long, Time/Date, RTE . . . "and in this event, send a message to the PC: "GPS On" so that the unit can be "tracked".

5. Communications

Whilst in Idle/Monitoring Mode, the unit can be communicated with by, and will respond to, a pre-programmed mobile phone and/or PC.

5.1 Dialling in from a PC

Select comm. port from modem. Select GSM data number of battery. Select dial. On connection, unit responds "Modem Connected", and "Live" data is displayed Screen one displays data from the Gas Gauge. Yellow flashes on certain windows indicate the data is 'live'. To change parameters (e.g. RTE mins), click Idle, then change the parameter, then Write, and then Live. (NB. Putting the unit into Idle mode enables it to receive new parameters, which are then written into the firmware, and then reflected in live mode). "Unit" comms controls (as opposed to the battery) are displayed on screen 3.

5.2 In Idle Monitoring Mode, GPS will be Switched Off

If the unit has not acquired-GPS data, the last known fix can be displayed by depressing the DATA button. This will display Time, Date, Precise Latitude and Longitude at the top right of the screen and also display a "Push Pin" on the map.

5.3 To Switch GPS On

Depress GPS On/Off button. On acquiring GPS data, the message "GPS Acquired" will appear at the bottom right of the screen. Unless tracking a moved unit, and to conserve power, the user should switch off GPS (by depressing the GPS On/Off button). To display the location press the Data button.

5.4 Switching Off the Unit from PC

Depressing the Unit Off button will completely shut down the unit. It must be noted the unit can only be switched on using the "On" button on the unit itself. The unit suitably cannot be remotely switched on.

5.5 Communicating with the Unit by Mobile Phone

Sending the command: ":L" from the mobile phone will trigger the response: "Batt serial no". Last fix Lat/Long, Time/Date, RM . . . mins", enabling the battery to be monitored "in the field". All other communications from the unit to the pre-programmed mobile phone have been described above. Whilst the unit can communicate with both PC and mobile phone simultaneously, it cannot generally receive and respond to ":L" requests whilst on line to the PC.

To enable monitoring of and communications with multiple batteries all operations/functionality are as described above for a single battery, plus:

(a) Index of Batteries (identified by serial number to each of which is allocated a GSM data number.) A "drop down window" will represent this. Clicking on the "Drop Down Arrow" will display all Batteries in the "Inventory". Scroll down to the battery to be contacted, and then follow "Call" instructions as previously described. Communicate with the selected battery as previously described;

(b) Multi-Pins (each representing a Battery serial number) Depressing the "DATA" button will display the "Pin" on the map. Each pin position will be saved on the map so that when (all) batteries have been located then (all) batteries remain displayed on the map. By "double clicking" on each "Pin" will display a "bubble" containing the battery serial number.(NB: when exiting the programme to save multipin locations, the operator must click on "Save" Mpt).

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A rechargeable battery which comprises:
a plurality of packs, each pack comprising one cell or a plurality of cells connected together in series and having a common and another terminal;
a shared line to which the common terminal of each pack is connected; and
one or more switching means,
each of said packs' another terminals being connected to one of said one or more switching means, each switching means being arranged to join and separate the another terminals of battery packs joined to said switching means such that each pack connected to the switching means is switched to a separate recharging input for recharging.

2. A rechargeable battery as claimed in claim 1 wherein each cell is a nickel metal hydride or a Ni—Cad cell.

3. A rechargeable battery as claimed in claim 1 wherein the recharging input for each pack comprises a respective pin of a multi pin plug.

4. A rechargeable battery as claimed in claim 3 in combination with a corresponding recharging device which comprises a plurality of recharging means in a housing and having a connector having a plurality of pins or sockets, each of said first and second recharging inputs being coupled to separate pins or sockets of said connector to separately recharge each pack.

5. A rechargeable battery as claimed in claim 1, wherein the switching means comprises one or more relays.

6. A rechargeable battery as claimed in claim 5 wherein the relays comprise multi poled relays.

7. A rechargeable battery as claimed in claim 6, wherein the or each relay is a relay having four or more poles.

8. A rechargeable battery as claimed in claim 1 wherein the battery further comprises a processor and sensors to sense and monitor the charge status of the battery.

9. A rechargeable battery as claimed in claim 8 wherein the processor is adapted to monitor the charge status of each cell or group of cells independently of each other cell or group of cells.

10. A rechargeable battery as claimed in claim 8 wherein the sensors, or further sensors, sense the temperature of at least one of the cells or groups of cells individually or of the cells as a whole and the processor is adapted to alter the rate of recharging or stop recharging if the temperature exceeds predetermined limits.

11. A rechargeable battery as claimed in claim 1, wherein the battery has a battery casing adapted for thermal insulation and the casing is made from aluminum or other suitable metal or metal alloy and is coated in nylon.

12. A rechargeable battery as claimed in claim 11 wherein a double coating of the nylon is applied to both the inner and outer surfaces of the casing.

13. A rechargeable battery as claimed in claim 1, wherein a foam-in-place resin is introduced into the battery within the casing to foam and cure and fill out voids within the casing.

14. A rechargeable battery as claimed in claim 1, in which a plurality of cells are housed within an inner casing that is housed in turn within an outer casing and having an air gap between the inner casing and the outer casing and with a heater being provided to heat the air gap in response to a temperature sensor that senses any reduction of the temperature of the air in the air gap below a predetermined threshold.

15. A rechargeable battery as claimed in claim 14, wherein the heating means is powered by the battery.

16. A rechargeable battery as claimed in claim 1, wherein the cells are housed in a casing, the cells being of nickel metal hydride type and the casing having an electrically operated vent in the casing and which opens when the battery is coupled to a recharging device.

17. A rechargeable battery as claimed in claim 16 wherein the vent opens automatically on initiation of recharging and closes automatically upon completion of recharging.

18. The rechargeable battery as claimed in claim 1 which further comprises an electronics telecommunications device for remote monitoring of the battery.

19. A rechargeable battery as claimed in claim 18, wherein the telecommunications device is a GSM transceiver.

20. A rechargeable battery as claimed in claim 18, wherein the telecommunications device further comprises a GPS facility capable of monitoring the location of the battery.

21. A rechargeable battery as claimed in claim 18, wherein the battery is configured to enable it to be remotely interrogated and monitored for its status and performance including its charge status, remaining run time, and present current drain.

22. A rechargeable battery as claimed in claim 18, wherein the battery is configured to enable it to be remotely monitored for its position.

23. A rechargeable battery as claimed in claim 22, wherein the battery is configured to enable monitoring of whether it has been disturbed/moved from its original location and to track where it is moved to.

24. A rechargeable battery as claimed in claim 22, wherein the battery has a motion sensor to serve as a trigger to switch on the telecommunications device for alerting the operator even when the battery is not first polled by the operator.

25. A rechargeable battery as claimed in claim 24 in combination with at least one other said rechargeable battery as a system, wherein each of the batteries is configured such that it may be independently polled for information.

26. A rechargeable battery as claimed in claim 25 in combination with at least one other said rechargeable battery as a system, and further in combination with a centralized computer facility with geographical map screen displays identifying the location of each unit.

27. A rechargeable battery as claimed in claim 1, wherein said first and second packs are switched for recharging substantially simultaneously.

28. A rechargeable battery as claimed in claim 1, wherein each switching means is coupled with a device providing feedback current protection.

29. A rechargeable battery as claimed in claim 28, wherein the device is a diode.

* * * * *